Dec. 31, 1935.    L. H. MIDDLETON    2,026,095
STARTER FOR MOTOR VEHICLES
Filed April 4, 1932
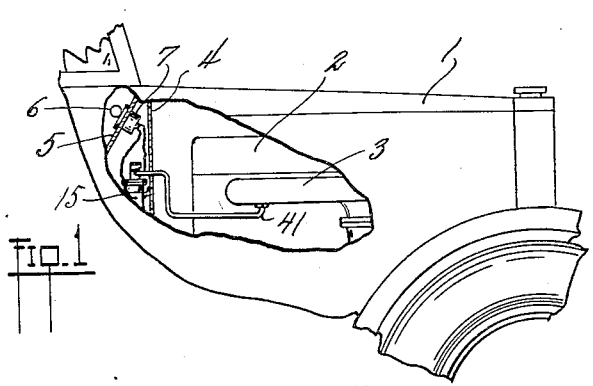
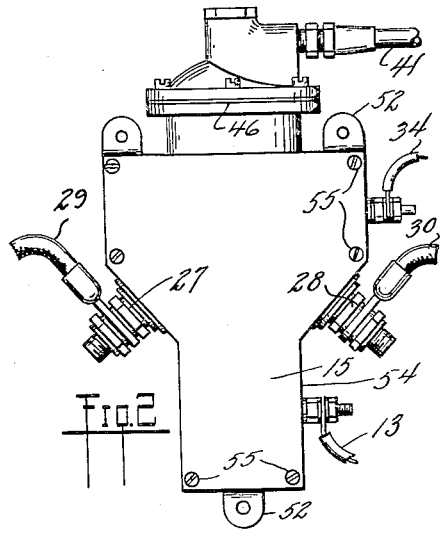
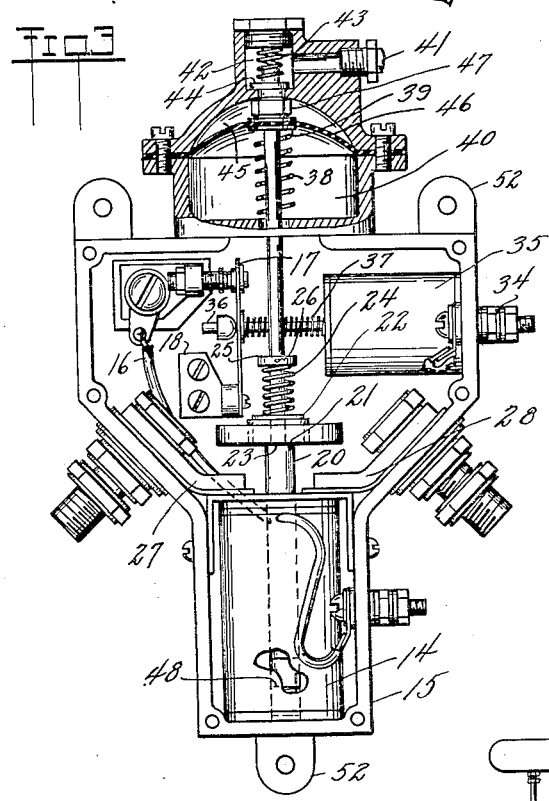
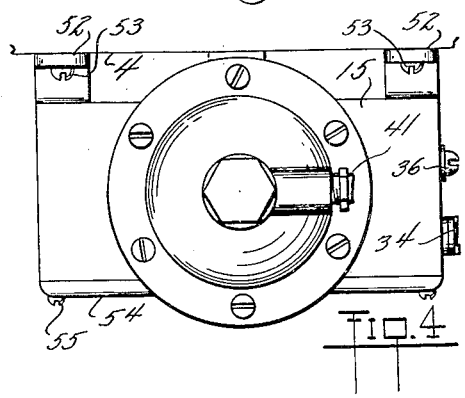
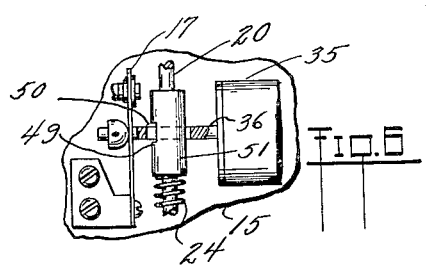
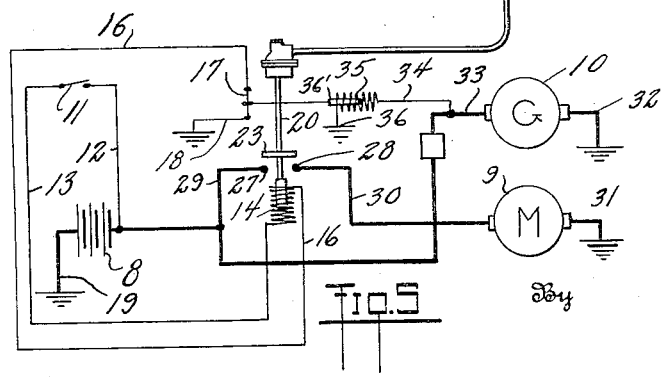
Inventor
Leslie H. Middleton
By
Attorney Patented Dec. 31, 1935

2,026,095

UNITED STATES PATENT OFFICE 2,026,095

STARTER FOR MOTOR VEHICLES

Leslie H. Middleton, Adrian, Mich., assignor to Schwarze Electric Company, Adrian, Mich., a corporation of Michigan Application April 4, 1932, Serial No. 603,109

2 Claims. (Cl. 290—36)

This invention relates to control devices for starting prime movers.

This invention has utility when incorporated in electro-pneumatic starters for establishing, or upon occasion, automatically re-establishing starting of internal combustion motors, especially in motor vehicles.

Referring to the drawing:

Fig. 1 is a fragmentary view of a motor vehicle having an embodiment of the invention incorporated therewith;

Fig. 2 is a detail view of the housing part of the unit, portions being broken away, more especially as to the connections;

Fig. 3 is a view of the device of Fig. 2 with the cover plate removed;

Fig. 4 is a plan view of the device of Fig. 2;

Fig. 5 is a wiring diagram; and

Fig. 6 is a detail view of the latch as incorporated in the device.

Motor vehicle 1 is shown as having prime mover or internal combustion engine 2 therein, provided with intake manifold 3. Between this motor or internal combustion engine 2 under the hood of the automobile, there is dash or partition 4 separating such engine from the interior of the vehicle, this dash 4 being forward and below instrument board 5. At this instrument board 5, key 6 may be operated for controlling ignition switch 7 and normally starting the motor, not only as to cutting-in the electric current from battery 8 through the ignition switch 7 for energizing the spark plugs, but for working out complete starting connections especially under the disclosure herein.

The regular ignition system is involved and the starting system having starting motor 9 generator 10, also the regular timer, breakers, coils etc. To the end that this starting switch or ignition may be thus automatically effected, there is associated with this switch 7, switch 11 having line 12 thereto from the battery 8. From the other side of this switch 11, line 13 extends to coil 14 in housing 15. From this coil 14, line 16 extends to switch 17 having ground 18 therefrom. Accordingly, there is closing of the switch 11 in a complete circuit through the coil 14 and the normally closed switch 17 to ground 18 having connection with ground 19 of the battery 8.

This energizing of the coil 14 pulls plunger 20 thereinto. This plunger 20 is provided with shoulder 21, abutting which is insulation washer 22 carrying terminal 23. This assembly 22, 23, is normally held against the shoulder 21 by compression helical spring 24 as thrust downward from collar 25 held against shifting as to the plunger 20 by readily removable key 26, which is held against longitudinally shifting by its seat in the collar 25. This coil 14, as thus energized, effects through the plunger 20, pulling of the terminal or contact 23 toward the coil 14 even to the extent of further compressing the spring 24 as the terminal 23 abuts contacts 27, 28. The contact 27 is terminal for power cable 29 from the battery 8. Contact 28 is terminal for power cable 30 to the motor 9 for starting the engine 2, say by the Bendix type of drive. This motor 2, as thus effective on the engine power shaft, has its power circuit completed by ground 31 in series with the ground 19 of the battery 8. There is accordingly high amperage and low voltage, say six volts power circuit, thus automatically rendered effective in turning over the motor 2 at a speed, which, even under favorable conditions, does not probably exceed 50 R. P. M.

When the engine 2 starts, it is effective in its connection to render generator 10 operative. This generator 10 has ground 32 and power line 33 therefrom to the circuit breaker coils, timing devices, as well as to the battery 8.

Directly connected to this generator circuit at the line 33 is line 34 to low amperage coil 35 having ground 36. This coil 35 is accordingly energized at all operations of the generator 10. This coil 35 is effective on plunger 36' to pull against the opposition of coil spring 37 and thereby open the switch 17. It is thus seen that, as the starting motor 9 has attained firing speed, the generator 10 is generating electric current, and there is effectiveness at the opening of the switch 17, notwithstanding the switch 11 be closed, that the coil 14 be de-energized. This means that spring 38 acts against collar 39 in chamber 40 to lift the plunger 20, so that the contacts 23 are clear of the contacts 27, 28. However, this spring 38 is of minor strength and may normally only hold the weight of the mass for idle open position. The sealing tendency for the current at the contacts 23, 27, 28, may thus not be overcome by this spring 38. However, from the intake manifold 3, suction line 41 extends to chamber 42 wherein spring 43 normally holds check disk 44 in closed position.

This suction line 41 stands ready to lift this check disk 44 and reduce the pressure in chamber 45 above diaphragm 46 held in position between the collar 36 and collar nut 47. This reduced pressure causes a quick upward snapping of the terminal 23 away from the terminals or contacts 27, 28, thereby cutting off the operation of the motor 9 during the effective operation of the engine 3 to have pneumatic control of the plunger 20, herein shown as suction.

In the coil 14 there is adjustable stop 48. When the gap between this stop 48 and the plunger 20 is zero, that is, when they are in direct contact, the suction pull in the chamber 45, required, say with the usual vacuum obtained in motor intake at 200 R. P. M., may be in the region of 14½ inches of mercury and approximates 15.6 pounds. When the gap between the adjustable stop 48 and the plunger 20 is .0195 inch, the holding force for the terminal 23 as to the contacts 27, 28, is 6.27 pounds. With the gap .039 inch, the holding action is 3.4 pounds. With the gap .078 inch, the holding action is 1.71 pounds. When the gap is as much as a quarter of an inch, the downward pull is only a fraction of an ounce. It is thus seen that the terminal 23 in its mid-position one-fourth inch from the terminal 27, 28, has initial pulling action which is not great if the stop 48 be of like clearance.

However, with the spring 38 only a balancing spring, this pull may be of increasing force and give an effective closing and holding for the starting of the motor 9. Furthermore, the area of the diaphragm 46 is sufficient to give several pounds pull for opening the switch 23, 27, 28, and holding such open even should the generator become defective in its operation, say due to trouble in the brushes or other unfavorable conditions, for as long as the engine 2 is operating, the predominate vacuum in the chamber 45 insures the holding of the switch 22, 27, 28, open as to the starting motor 9, even should the coil 35 allow the switch 17 to be closed while the switch 11 is also closed.

The opening of this switch 23, 27, 28, accordingly occurs after the firing operation in the engine 2, for the starter operation of the motor may not be effective to pull the vacuum in the chamber 45 to more than 7 inches.

However, at once the firing starts, the increase in the vacuum at once snaps the switch to open position and there is the holding against shifting due to vehicle vibration of the engine 2.

While occasion therefor may not always be in order, supplemental provision may be taken against vibration of the terminal 23, due to fluctuation pressures in the chamber 45, say even to the extent of no vacuum wherein back firing is stopped by the check valve 44. The plunger 20 does not drop under these circumstances, for notch 49 may be engaged by ledge 50 in the plunger 36'. This notch 49 is in collar 51 in lieu of the collar 25.

The housing 15 may be located on the engine block 2 or desirably by ears 52 having screws 53 therethrough to anchor this housing, say on the inside of the dash 4 below the instrument board 5. These devices of the unit are enclosed in the housing 15 provided with cover plate 54, attached thereto by screws 55. The check disk 44 is of light weight and one which is not susceptible to reaction by vapors from the fuel. Likewise, the diaphragm 46 is of flexible material, which will not be deteriorated by temperature or time conditions to which exposed. This may be a specially treated fabric or specially treated rubber.

The device hereunder is accordingly one which will be effective upon cutting-in of the ignition, first to have the starting motor effective in starting the engine 2. At once the engine gets to its firing, the starting motor is cut out and the solenoid or magnets 14, 20, de-energized.

This de-energizing occurs because of the effectiveness of the generator 10 to open the switch 17. This opening of the switch 17 is effective at all times during generator operation, and is accordingly not affected by disturbances in the ignition circuit between the generator 10 and the battery or else in the ignition circuit. The pneumatic means are of such relation to the electric means that such offsets in a major degree, any action of the electrical means, and it is a steady and positive control.

Peculiar value arises herein for the cooperation in re-establishing a starting condition, more particularly as such re-establishing of the condition does not detrimentally or disastrously occur while the engine 2 is still operating. That is, there may not be a jamming of the Bendix drive. While the pneumatic control is not effective for the cut out in the starting until the engine fires, this pneumatic control as to re-establishing a condition, automatically effects a time lag before the starting motor may be cut in when the engine 2 is started. Assuming that in the operation of the engine 2, 350 R. P. M. may be the idling speed, this holds sufficient vacuum in the pneumatic control. Upon the engine 2 slowing down below idling speed to, say 200 R. P. M. at this point, the generator 10 may be so slowed up that there is not sufficient output therefrom to maintain the control conditions. Even though the switch 17 be closed, this device does not cut in at 200 R. P. M., for the reason that the vacuum is maintained, and under the proportion of parts herein disclosed, in coming down from the firing speed, the engine 2 may be dead or at rest for almost sixty seconds before the diaphragm 46 is sufficiently released so that the solenoid 20 may be effective in overcoming the holding action and re-establish the cutting in of the starting motor 9.

What is claimed and it is desired to secure by Letters Patent is:

1. A starter for an internal combustion engine including suction means and an engine shaft, said starter embodying therein a motor adapted to be operatively connected with the engine shaft, a generator driven from the engine, an electric battery, means forming a power circuit adapted to be held open by the suction means between said battery and said motor, a normally open switch in said circuit, a magnet for closing said switch, a control circuit for the magnet, a manually operable switch in said control circuit closable to energize said magnet, a second normally closed switch in the control circuit, generator actuated means for opening said normally closed switch in the control circuit, and a latch set by the generator actuated means for precluding suction means drop off to release the normally open switch for the magnet closing to re-start the motor during operation.

2. An engine to be started, a starter unit therefor comprising a housing embodying therein a first solenoid, a first circuit for the first solenoid, a pneumatic chamber in tandem with the first solenoid, a common bar between the first solenoid and chamber, a control effective to prevent minor pressure fluctuations from releasing the bar even after the bar has been released by vacuum from such fluctuations in the pneumatic chamber, first switch means carried by the bar, a starting motor for the engine, a second circuit for the motor cut in by said first switch means, a second solenoid operatively connected to said control, and second switch means in the first circuit actuable from the second circuit for affecting the first solenoid, each of said switch means being assembled in the unit, said first switch being actuable from pneumatic pressure major fluctuations in such chamber apart from said first solenoid and independent of the first circuit, there being operative connection means from the engine including said second solenoid effective through said first circuit independent of said pneumatic pressure fluctuation and providing actuation responsive to engine starting for opening said second switch means in cutting out the first circuit and the first solenoid.

LESLIE H. MIDDLETON.